(12) United States Patent  (10) Patent No.: US 8,549,160 B2
Lazar et al.  (45) Date of Patent: Oct. 1, 2013

(54) PERSONAL MEDIA RELAY FOR REBROADCASTING STREAMING DATA

(75) Inventors: Z. Peter Lazar, Blacksburg, VA (US); Isaac Simantov, Beit Herut (IL)

(73) Assignee: Silent River, LLC, San Francisco, CA (US)

( * ) Notice: Subject to any disclaimer, the term of this patent is extended or adjusted under 35 U.S.C. 154(b) by 651 days.

(21) Appl. No.: 12/251,213

(22) Filed: Oct. 14, 2008

(65) Prior Publication Data

US 2009/0157893 A1  Jun. 18, 2009

Related U.S. Application Data

(60) Provisional application No. 60/979,805, filed on Oct. 12, 2007.

(51) Int. Cl.
*G06F 15/16* (2006.01)
(52) U.S. Cl.
USPC .......................... 709/230; 709/231; 709/232
(58) Field of Classification Search
USPC ......................................... 709/231, 230, 232
See application file for complete search history.

(56) References Cited

U.S. PATENT DOCUMENTS

| | | | |
|---|---|---|---|
| 7,103,770 B2 * | 9/2006 | Conrath | 713/155 |
| 2002/0038359 A1 | 3/2002 | Ihara et al. | |
| 2003/0212803 A1 * | 11/2003 | Wu et al. | 709/228 |
| 2004/0143672 A1 | 7/2004 | Padmanabham et al. | |
| 2004/0148635 A1 * | 7/2004 | Merchant | 725/109 |
| 2004/0225728 A1 * | 11/2004 | Huggins et al. | 709/223 |
| 2004/0236863 A1 | 11/2004 | Shen et al. | |
| 2006/0174025 A1 * | 8/2006 | LaRue et al. | 709/231 |
| 2007/0041663 A1 * | 2/2007 | Cho et al. | 382/299 |

OTHER PUBLICATIONS

PCT Written Opinion, PCT Application No. PCT/US08/79837, Dec. 10, 2008, 4 pages.
PCT International Search Report, PCT Application No. PCT/US08/79837, Dec. 10, 2008, 1 page.

* cited by examiner

*Primary Examiner* — Ranodhi Serrao
(74) *Attorney, Agent, or Firm* — Fenwick & West LLP

(57) ABSTRACT

A Personal Media Relay (PMR) is used to retransmit data in a system for point-to-point data streaming over a TCP/IP network. It is "Personal" because it is downloadable by end-users will onto their own personal computers (PCs) in order to help their other devices (e.g. a mobile device) send or receive data. The user installs the PMR, which is a software application, onto a personal computer (PC) that is perhaps more powerful and accesses higher Internet bandwidth than the Sender. Subsequently, the user streams data from the Sender to the PMR, which resends the live streaming data to potentially many Viewers. During PMR installation and configuration, users are given the option of allowing others to utilize their PMR as well for rebroadcasting streaming data.

12 Claims, 4 Drawing Sheets

PERSONAL MEDIA RELAY FOR REBROADCASTING STREAMING DATA

This patent application claims priority from U.S. provisional application 60/979,805 of the same title filed on Oct. 12, 2007.

BACKGROUND OF THE INVENTION

1. Field of the Invention

The present invention generally relates to peer-to-peer streaming video services, and more particularly to mechanisms for providing rebroadcast services to a streaming video installation.

2. Background Description

As Internet use has become more prevalent, there has been an increased interest by average users to offer streaming data broadcasting services of their own. One such example is the ability to transmit live video from home computers for the purpose of remote monitoring. This undertaking is still prohibitive for the average user. The cost and difficulty of acquiring and installing the software necessary to offer generalized services over the Internet is usually prohibitive. Proper access control and security are also a problem. Those that are successful at setting up basic Internet services often do not understand the procedure necessary to configure and maintain access control lists to keep their systems safe from outside tampering and interception. One of the most significant barriers is that the average Internet user does not receive a static Internet address from his or her Internet Service Provider (ISP). This means that each time he or she connects to the Internet, the hosting system receives a different Internet address effectively preventing others from accessing the system in a consistent manner. This is similar to receiving a different phone number every day. There is no easy way for a viewer to know where to contact a server. If average Internet users wish to offer their own Internet services, it is desirable to have these highly technical issues handled transparently without complex procedures.

Prior art approaches to live streaming video or other data services fall into two categories: the Two-Node Architecture or the Linear Three-Node Architecture. The first and most common approach is the Two-Node Architecture. With this architecture, the user/source of data services (the Sender) sets up a server on the Internet, which is then available to one or more Viewers. An advantage of this approach is that the data stream is connected directly between the Viewer's and the Sender's server. This allows a strong level of privacy and security and at the same time allows the Viewer to control its individual data stream. However, a drawback of this approach is that it requires the Sender to acquire, install, configure and maintain his or her own Web server system and utilize a static IP address. When a requester or Viewer wishes to receive data on a remote computer, he or she must know how to locate the machine with the data (the Sender's server) and then have access to the functions required to send that data to the Viewer.

The ability to locate the Sender's server is difficult with most Internet services because of the prevalence of dynamic Internet addressing. With dynamic Internet addressing, the Viewer will not have a consistent address to use in order to retrieve data from the server. Finally, when the Viewer locates the Sender's server machine, he or she must have proper access permissions. If the person owning the server (the Sender) does have a static Internet address, he or she must still install, configure and maintain his or her own complex World Wide Web site and must enforce security policies to prevent unauthorized access and tampering ("hacking"). These tasks are difficult and cumbersome for the average Internet user.

Since this approach is not a database-centric approach, there are also further difficulties in providing features such as status, logging, and session handling. The Two-Node Architecture is more difficult to configure than other architectures, and for the average Internet user this often results in limited system security and breaches of system integrity. Another drawback of this approach is that all of the components including the server and the Web site must reside on the same physical machine, thereby reducing scalability. Further, this system is prohibitively costly and complex for the average user. These problems are typical of a two-node client/server architecture where you have a direct connection between the Viewer and the Sender's server.

Other systems attempt to overcome the problems of the Two-Node Architecture by adding a third node. These systems use a Linear Three-Node Architecture. Both the Viewer and Sender's server connect to a third node, called the Mediator Node, which has a static Internet address. This connection model solves the location problem because the Viewer does not need to know where the server of interest is located. It simply connects to the Mediator Node. This approach also overcomes the access problem. The Mediator Node handles the authentication of the Viewer and ensures that he or she has the permissions necessary to connect to the Sender's server. This approach does not require the Sender to maintain a Web site; it can use a database-centric approach, and can offer greater scalability. Furthermore, the Sender has the potential to establish access control lists using the centralized Web site of the Mediator Node.

However, this approach has a serious drawback: the Mediator Node must handle the actual data stream from the server to the viewer. This process creates several problems. First, the Mediator Node must be able to handle the increased resource requirements, and so this approach does not scale well when many Viewers are using the system. Secondly, there is a reduction in privacy and control, since all of the Sender's streaming data are now accessible to the Mediator Node. Once the Viewer's and Sender's server are connected through the Mediator Node, all of the data requested by the Viewer must travel through the Mediator Node before reaching the Viewer.

A further approach (taken by InetCam) is to use a third Mediator node just to handle location information. This approach uses a dynamic DNS service to allow clients to locate the video source. However, this requires that the user handle the security and access controls on the Sender side. This includes setting up and configuring a bundled web server including creating user access accounts and creating a web site. This approach makes the system difficult for the end user.

An additional approach (taken by iFriends) uses a Mediator node but does not allow the user to stop and start a stream using the viewer applet directly. Accessing or leaving a web page controls the stream. The web server handles the session tracking. This reduces the user's control over a stream requiring them to leave or close a web page to stop the stream. As a result, this system is not suitable for remote monitoring. This approach does not allow a user to simply leave their viewer software open without actually accessing the stream. This negatively impacts network bandwidth.

The foregoing deficiencies in the prior art were substantially overcome by U.S. Pat. No. 7,103,770 "POINT TO POINT DATA STREAMING USING A MEDIATOR NODE FOR ADMINISTRATION AND SECURITY" to Bartley C. Conrath (the '770 patent), assigned in common with the present invention. The '770 patent provides optionally for a server based Media Relay. However, a server based MediaRelay does not provide a distributed and personal user control over the rebroadcast of streaming data to a wider number of viewers.

SUMMARY OF THE INVENTION

It is therefore an object of the present invention to provide a mechanism downloadable by a sender to a personal computer of the sender for the rebroadcasting of streaming data to a wide number of viewers.

This invention discloses a Personal Media Relay (PMR) used to retransmit data in a system for point-to-point data streaming over a TCP/IP network. It is "Personal" because end-users will typically download it onto their own personal computers (PCs) in order to help their other devices (e.g. a mobile device) send or receive data.

A Sender node (e.g. implemented in sending device 110) serves data to the PMR and subsequently one or more Viewer nodes can access the data from the PMR. A Mediator node provides administration and security and a static Internet location for accessing the system. The PMR improves upon the Media Relay described in the '770 patent, and operation of the PMR assumes a point-to-point data streaming system as described in the '770 patent.

The PMR is not a required component of the point-to-point data streaming system. Users can transmit data from Sender to Viewer with an assisting Mediator node, and without any involvement by the PMR. However, users may optionally choose to deploy a PMR when the Sender is limited by bandwidth or processing power (e.g. when the Sender is a mobile device). In this case, the user installs the PMR, which is a software application, onto a personal computer (PC) that is perhaps more powerful and accesses higher Internet bandwidth than the Sender. Subsequently, the user streams data from the Sender to the PMR, which resends the live streaming data to potentially many Viewers.

During PMR installation and configuration, users are given the option of allowing others to utilize their PMR as well for rebroadcasting streaming data. Consequently, the Personal Media Relay may be used by a single Sender, by a group of related Senders, or by any Sender in the network, depending upon the configuration.

Furthermore, a PMR may send a data stream to another PMR in order to ease the load on it. For example, if a PMR can support up to twenty viewers, it may serve nineteen viewers and, using the twentieth connection, send the stream to another PMR that may support another twenty, and optionally ask for more help from another PMR.

Besides live rebroadcasting, the PMR can store the received data and resend it later as requested by authorized Viewers. Whereas the data received by the PMR is in a specific format, the PMR can translate the data to other formats which can be selectively uploaded by the user to other systems expecting that format (for example, uploading video in .WMV, .AVI, .MOV, or .MPG file formats to YouTube).

Another special feature of the PMR is that it can save data it receives from the Sender over a set length of time and then automatically archive or delete data after it has aged past a selected limit. This feature can be used for applications such as security monitoring where video data is stored for a set length of time.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Personal Media Relay

Technical Implementation

For the purposes of this discussion, the Personal Media Relay will be referred to as the 'PMR' and the greater system in which the PMR functions—including Sender, Receiver and Mediator Nodes—will be referred to as 'Vidrunner'.

The Vidrunner System architecture allows many simultaneous instances of Senders and Receivers due to the following:

P2P—The streaming of the media is peer to peer (P2P) which means that the media will not be sent to Vidrunner's server and from there to the target clients. This will enable Vidrunner to support millions of concurrent users with relatively modest infrastructure.

Any network—The IP network itself may be over many kinds of networks, including TCP/IP land based as well as TCP/IP over wireless networks such as 3 G, WiMAX or Wi-Fi. This means that once the mobile device has the ability to communicate over IP, then Vidrunner communications requirement can be met.

Peer can be anywhere—Vidrunner is designed to stream data between two devices that are connected anywhere on the Internet. This means that, in the mobile world, two communicating peers do not have to necessarily use the same cellular carrier. It is also conceivable that the one peer will be on cellular network, the second on WiMAX network and the third on Wi-Fi network and the fourth will use a land-based ADSL connection.

Figure 1:
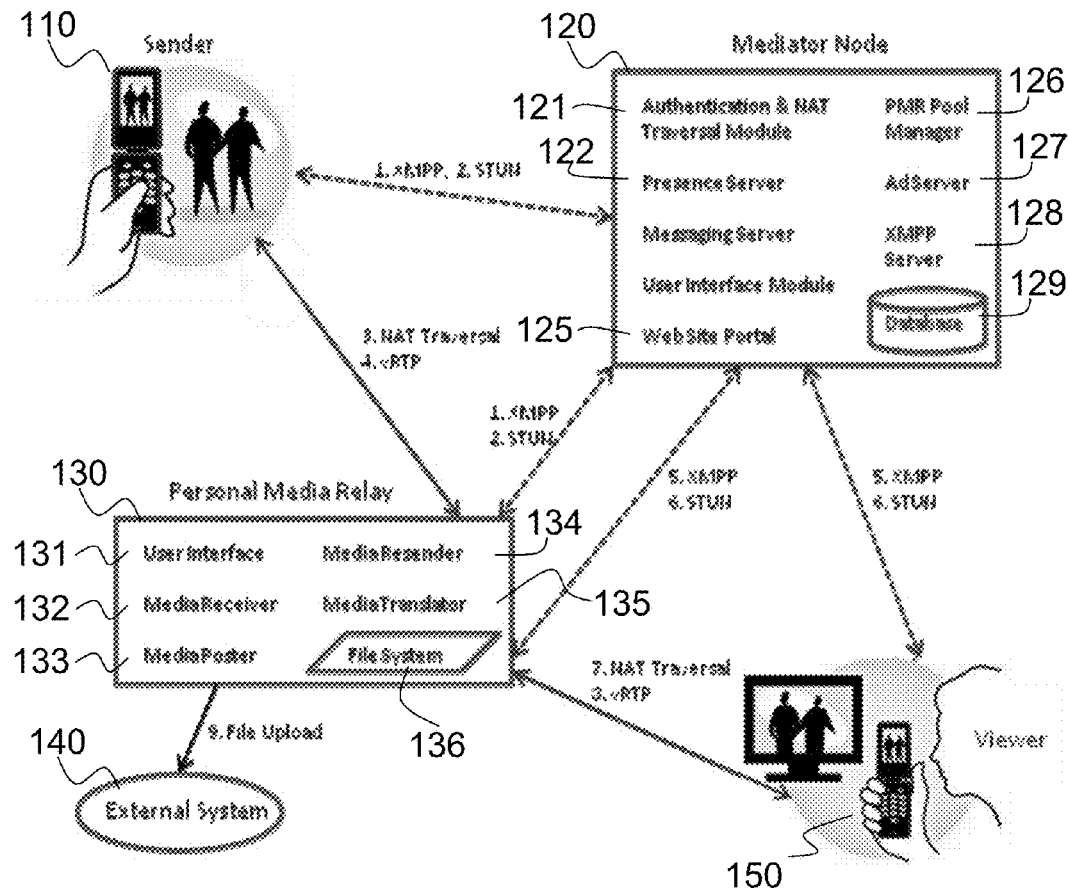
FIG. 1 is a schematic diagram showing a streaming data system with a mobile sender, a mediator node, a mobile receiver, with the addition of a personal media relay.

Referring now to FIG. 1, there is shown the basic Vidrunner data streaming system architecture (Sender 110, Mediator Node 120, and Viewer 150), where both Sender 110 and Viewer 150 are mobile devices. The PMR 130 extends the system architecture to also allow each Sender 110 to reach many more Viewers 150 than it could otherwise—overcoming the Sender's limitations of processing power and bandwidth.

Vidrunner System Components

In order to better understand the PMR, this section describes the greater Vidrunner system.

Vidrunner involves the following main components:

Mediator Node 120

Extensible Messaging and Presence Protocol (XMPP) Server 128 and Presence Server 122 for handling presence and messaging Authentication and Network Address Translation (NAT) Traversal Module 121, for use of Simple Traversal of UDP through NATs (STUN)

Ad Server 127 that will connect to a few online providers of Internet advertisements and will negotiate the most suitable clip to be served based on user location and best price for Vidrunner from the ad agency.

Web site portal 125

Sender 110 (may be packaged in the same application as the Viewer)

Viewer 150 (may be packaged with the Sender)

Personal Media Relay 130 (PMR)

Because the present invention pertains specifically to the Personal Media Relay, only this component will be discussed in any specific detail. Nevertheless the overall architecture is depicted, messaging approach described and the Sender/Viewer User Interface summarized below to give readers a broader view of how the invention functions from an end-user perspective.

As depicted in FIG. 1, there are four basic components of the Vidrunner system: The Sender node 110, the Viewer Node 150, The Mediator Node 120 and the Personal Media Relay 130 (PMR). Note that the dotted line communications in the preferred implementation shown in FIG. 1 use XMPP and STUN, while the solid line communications between Sender 110 and Viewer 150 via PMR 130 use NAT Traversal and vRTP. Of the four components, the PMR 130 is an enhancement (i.e. in the basic Vidrunner system described in the '770 patent, communication between Senders and Viewers is accomplished without a PMR). Because the present invention focuses on the PMR 130, only the subparts of the PMR are discussed in detail below. The subparts of the Mediator Node 120 are discussed only in relation to how they interact with the PMR 130.

Session Management

All elements (Senders, Viewers, PMRs) communicate with the server using XMPP messages. These messages are sent through a TCP connection which is constantly open. Once the TCP connection is disconnected, the Mediator Node 120 knows about it automatically. Consequently, that specific element is considered to be down and the appropriate actions should be taken to handle it.

Sender/Viewer User Interface Basics

In the initial implementation of Vidrunner, the Sender 110 and Viewer 150 are combined into a single application that has the following basic functionality:

Change user settings (username, password)

Login to the mediator node (Vidrunner.com)

Upon login, the user can perform the following basic actions: Broadcast to others, View streaming data being sent by others, view Buddy list, view Clip library.

Broadcast to others

Users can broadcast to a Default Group of viewers, to a specific user in the Buddy List (roster), to any Vidrunner viewer who logs into his/her broadcast, or to the PMR. Users can also record without broadcasting.

View

Users can select a Buddy who is currently broadcasting data or can wait for a specific Buddy to begin transmitting. Optionally, a user can locate another user who is not a buddy and view his/her broadcasting if the broadcast is set to be "For All".

Buddy List

Users can select from a list of previously defined Buddies (other users) or add new Buddies. Data can be streamed to any buddy selected from the buddy list.

Alternatively, streaming data from any buddy can be viewed. The Buddy List brings up an important notion of presence in the Vidrunner application. Unlike a TV or radio broadcaster, for example, Vidrunner Senders can tell who is viewing the sent data stream. Viewers and Senders can at any time see the online status of others on the network (offline, online, recording, sending, viewers). Viewers and Senders can also see the GPS location of buddies (for peers that have GPS enabled) and also chat via text messages with buddies.

Clips—Users can view previously recorded data streams

Other expected user interface features such as setup, help are also a part of the Vidrunner User Interface Personal Media Relay (PMR) Specification The PMR is composed of the PMR User Interface 131, Media Receiver 132, Media Resender 134 and Media Translator 135, Media Poster modules 133. The PMR Pool Module 126, used to manage pools of PMRs, resides on the Mediator Node 120.

PMR User Interface Module

The PMR application presents the following basic functionality to the end-user via a simple graphical user interface:

Turn the PMR ability to rebroadcast on and off

Select which Senders may broadcast to the PMR
  Only the PMR owner
  Owner and Owner buddies
  Any user Determine whether the PMR can be placed in a pool of PMRs and thereby the user and others in the pool can leverage each others' PMRs for sending to many more viewers than otherwise possible.

Select the data format of the broadcast to and from the PMR

Choose to store received personal broadcasts in local files, or upload the broadcast to a public service such as YouTube, MetaCafe, Flickr, etc., using each service specific protocol and file format. Set this to occur automatically but place bounds (duration or size) on how much is saved—to prevent filling up the hard drive.

Media Receiver Module

The Media Receiver module 132 receives the media data from the Sender 110 and then recombines the data into the format in which it was sent by striping headers and joining data chunks into the underlying file format encoding (currently 3 GP). Then it passes this data to the Media Resender 134 for rebroadcasting to a Viewer 150.

The Media Receiver 132 is a server waiting for incoming data stream with very little data flowing back to sender 110. The Media Receiver 132, much the same as the Media Sender 110, acts at the application top level layer and manages networking. The main tasks of the Media Receiver 132 are as follows:

Utilize the Mediator Node 120 to passively create and maintain a session with the other peer (e.g. the Media Receiver 132 does not initiate but rather responds to other peer messages).

Accept start session messages.

Respond to ensure session remains active.

Respond to end of session messages.

Join received media data fragments into one chunk and buffer it until transfer is complete.

Unpack received data fragments and strip header information

Handle confirmation of accepted data.

Recover from network failures (e.g. may discard non transmitted chunks to achieve synchronization with timeline).

If data is encrypted, decrypt according to session encryption keys.

Figure 2:
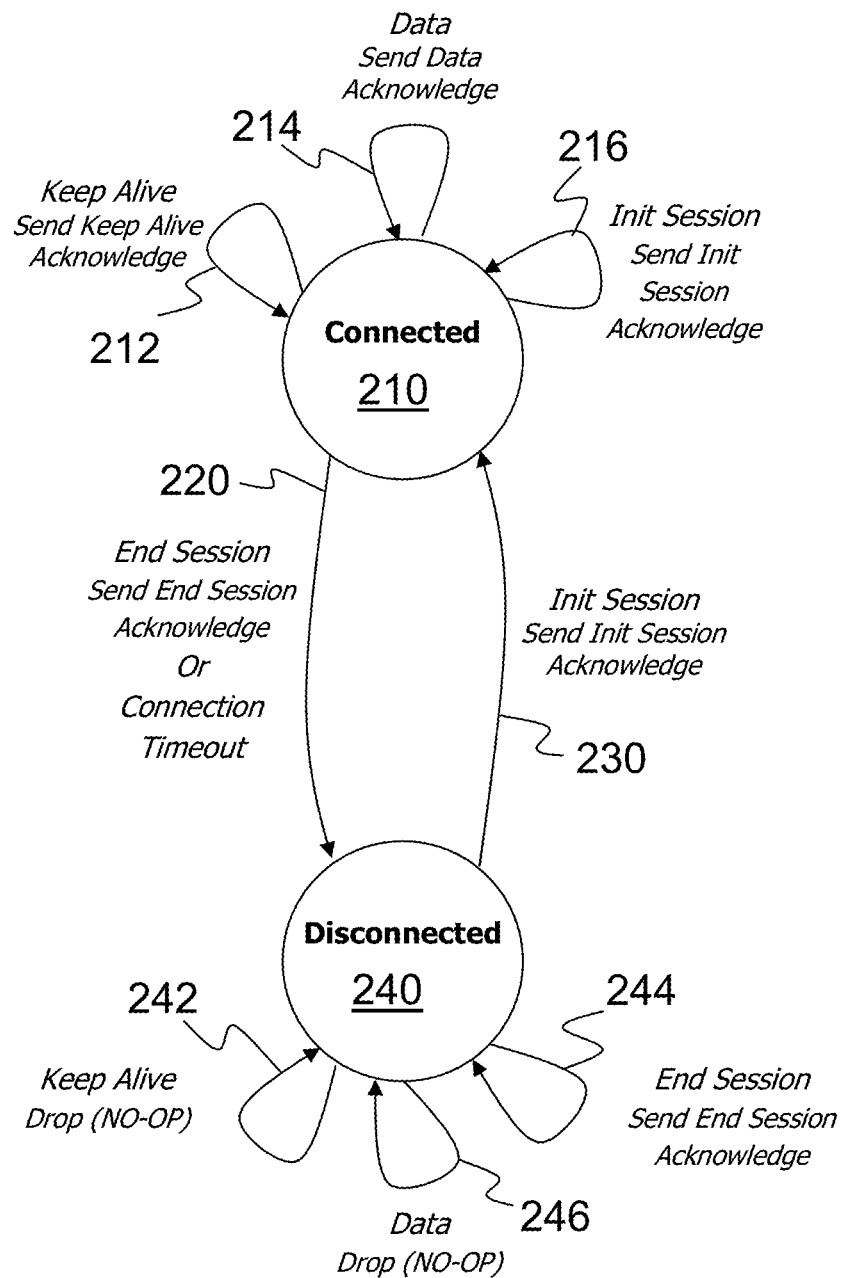
FIG. 2 is a state transition diagram for a media receiver component of the personal media relay.

As depicted in the Media Receiver state diagram in FIG. 2, state transition is triggered by external messages coming from the remote peer (Media Sender 110 in the client application) or by sensing that a certain network connection timeout has occurred.

The Media Receiver 132 can be in one of two states:

Connected 210, or

Disconnected 240.

The Media Receiver 132 moves to the connected state 210 only after receiving an Init Session message 230 from the Media Sender 110. Then it keeps the connected state if it receives Keep Alive 212/Data 214 or (another) Init Session 216 messages from the Media Sender 110.

If it fails to get any such message or it explicitly receives an End Session message 220 it moves back to the Disconnected state 240.

While in the Connected state 210, the Media Receiver 132 accepts incoming messages such as Data 214, Keep-Alive 212 or Init Session 216 (although the latter has no effect). To each of these messages it reacts by staying in the Connected state 210 and sending an acknowledge message (212, 214, 216) to the remote peer.

When in the Disconnected state 240, the Media Receiver 132 is not reacting to any message from the remote peer (such as Keep-Alive 242 or Data 246) since it is not attached to any session. It only acknowledges End of Session 244 messages to help the remote peer close a session.

Media Resender Module

Streaming the Media in Timely Fashion to Viewers

The Media Resender 134 is responsible for handling the sending of recorded media to receiving peers. It packs the media data as obtained by the Media Receiver 132 in network applicable format and makes sure it arrives at the Viewers 150 (or to another PMR down the road).

The Media Resender 134 acts at the application top level layer and manages networking. The main tasks of the Media Resender 134 are as follows:

Utilize the Mediator Node 120 to actively; create and maintain a session to the other peer.

Start the session.

Make sure session remains active

Manage session encryption keys

End the session

Buffer media data for sending.

Pack media with application header information

Message type

Session identifiers

Chunk numbering

Ensure the delivery of each chunk of recorded media.

Listen to incoming acknowledge messages.

Assign unique identifiers to sent packets.

Recover from network failures (e.g. may discard non transmitted chunks to achieve synchronization with timeline).

May encrypt sent media data

Figure 3:
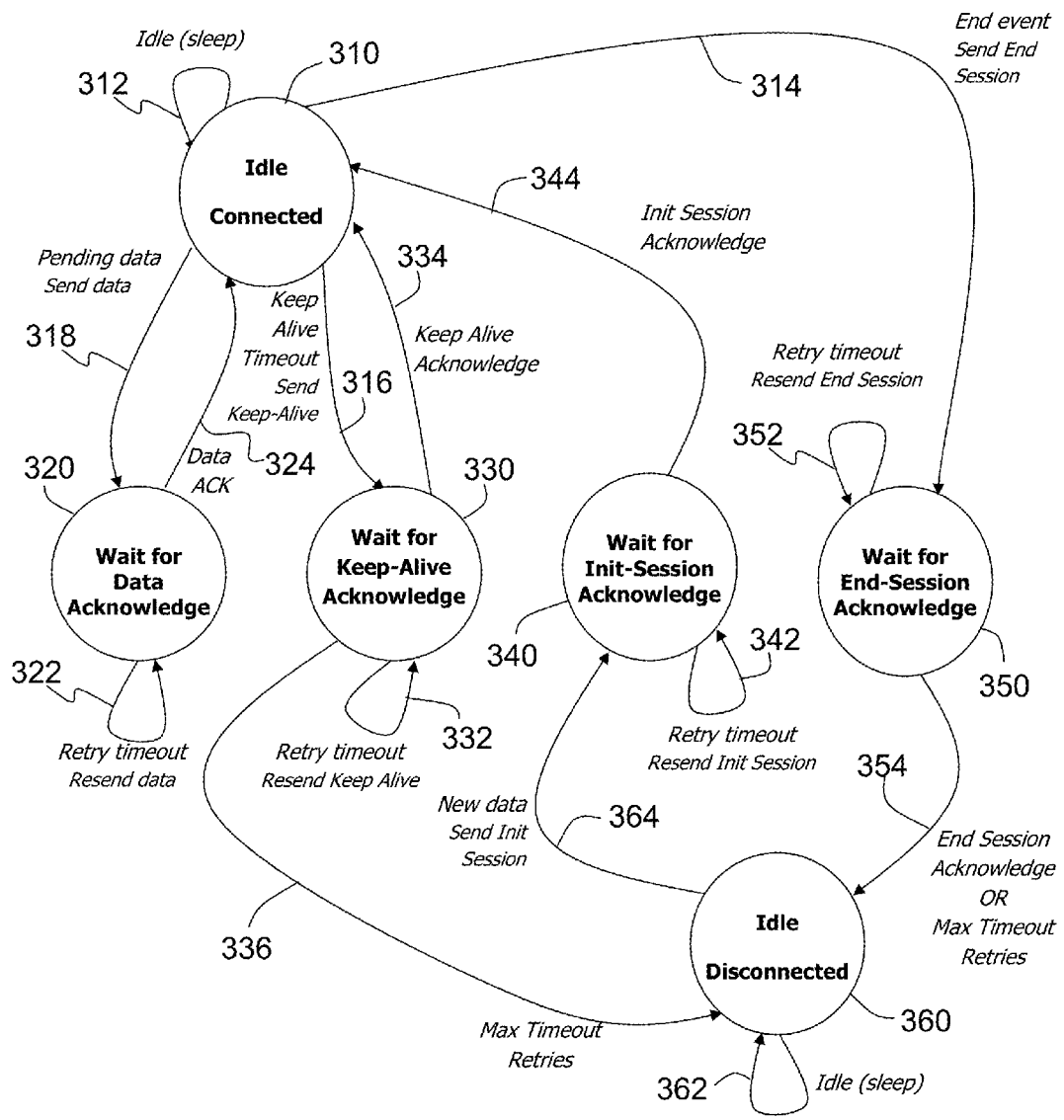
FIG. 3 is a state transition diagram for a media resender component of the personal media relay.

As depicted in FIG. 3, the Media Resender 134 states can be divided into 3 levels, 1. The "Idle Connected" state 310 in which the Media Resender 134 waits for events such as pending data 318, keep-alive 316 or an end of session event 314 from the application layer.

2. Four "Wait for . . . " states in which the Media Resender 134 is waiting for a particular message to arrive from the remote peer to acknowledge a previous message. The Four "Waiting" states are:

Wait for Data Acknowledge 320

Wait for Keep-Alive Acknowledge 330

Wait for Init-Session Acknowledge 340

Wait for End-Session Acknowledge 350

These states are timed based (322, 332, 342, 352). This means that they either accept an incoming message or they expire while awaiting an acknowledgement.

3. The "Idle Disconnected" state 360 in which the Media Resender 134 has no open session with a remote peer.

Transition to the Idle Connected state 310 occurs after successfully sending an Init Session message 364. This occurs while waiting for acknowledgement in the [Wait-For-Init-Session-Ack] 340 state and receiving an [Init-Session-Acknowledge message] 344 from the Media Resender 134.

Subsequently, a transition back to the Idle Disconnected state 360 is possible due to an explicit End-Of-Session event 314 (followed by and End Session Acknowledge or Max Timeout Retries 354) or by an implicit loss of connection (no Keep-Alive Acknowledgment 334 messages after Max Timeout Retries 336).

When in the "Idle Connected" state 310, the Media Resender 134 is normally busy sending Data messages 318 and Keep-Alive messages 316 to the Media Receiver 132 and is waiting for acknowledgments (324, 334). Or the Media Resender 134 may be idle 312; it may also be idle 362 in the Idle Disconnected state 360.

The only way to end a session is by an external event (not related to the network) from the application layer (End-Session) which results in an attempt to gracefully end the session with the remote peer by sending an End-Of-Session message 314 to it. Abnormal network problems (disconnection or heavy loss of messages) can also result in an end of session.

Because the Media Resender 134 is responsible for the session, it controls the session ending.

Media Translator Module

The Media Translator module 135 translates the incoming data stream from one format to another. It can also translate saved data files from one format to another.

Data Stream Transport Protocol

Currently the data stream transport is implemented in a protocol which we have named Vidrunner Real-time Transport Protocol (vRTP). vRTP is a protocol that was developed for reliable transportation of the media data itself from peer to peer in real time over User Datagram Protocol (UDP). The vRTP protocol is tailored to the specific needs of the invention. The system's design considers the kind of data that is to be transferred and its characteristics. These can be presented by the following assumptions that are derived from the underlying capabilities of the API and hardware:

Media data is a semi real time stream (it contains a built in delay between sender and receiver).

Stream is already divided into chunks of 50-300 kilobytes containing 4 to 15 seconds of recorded media (according to recording partition timing).

The network bandwidth should allow the sending of each chunk in less time than it takes for the video to record the next chunk.

Each chunk of data cannot be considered delivered unless it reaches the other party application layer as one continuous chunk.

Order of chunks must be kept.

If a network failure occurs or a chunk arrives out of order then a chunk may be discarded in order to compensate for lost time but that is not mandatory.

The above assumptions dictate a relaxed version of RTP. This enables a simpler implementation and optimization for latency and bandwidth consumptions.

Data Stream Format

The data transported in vRTP can be several different formats. The current default is 3 GP. This is the file format specially developed for 3rd generation (3 G) mobile devices. It is a simplified version of MPEG4 (simplified to fit the bandwidth needs of mobile devices). MPEG4 (also described as MP4) is one of the main standards for delivery of video and audio over the Internet. Other formats can include .WMV, .AVI, .MOV, or .MPG.

Media Poster Module

The Media Poster Module 133 saves the incoming data stream (which may have been modified by the Media Translator Module 135) into a file in RAM. It also can save this to the file system 136 and/or upload it to another location/service 140.

The Media Posting Module 133 performs its work as directed by the user via the User Interface Module 131.

Its operation may either be real-time as directed by the user, or may be preprogrammed.

PMR Pool Manager 126

During setup or configuration, users select whether the PMR can be part of the PMR Pool. When in a pool, all PMRs that are currently running can assist senders in broadcasting to more viewers than they could otherwise with only their own PMR. The pool is fault tolerant in that if a particular PMR in the pool stops functioning without notice, the Viewers and the session should be able to recover from it.

Pool Settings

MAX_CONSUMERS—maximum number of end consumers that the system supports for one producer. This is a system-wide number that may change according to technological and business considerations.

PMR_MAX—maximum number of outgoing connections (end consumers or other PMRs).

TREE_DEPTH—Maximum depth of a tree of PMRs. The system can support a maximum of PMR_MAX power (TREE_DEPTH-1) receivers per one sender.

Tree Builder

The Tree Builder runs on the server side. It needs access to the PMR Pool Manager 126 which is also on the server. It communicates with the PMRs over XMPP messages and builds a tree.

Figure 4:
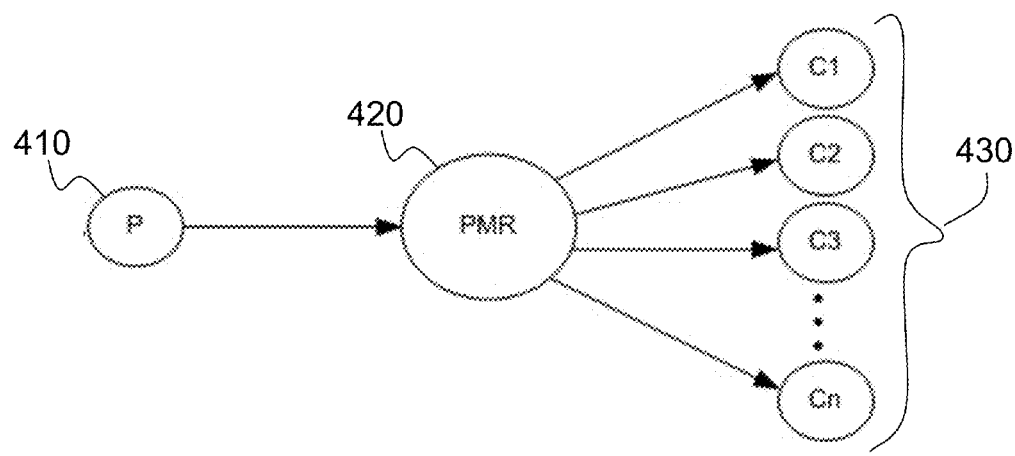
FIG. 4 is a schematic diagram showing a basic PMR tree with one node and depth zero.
Figure 5:
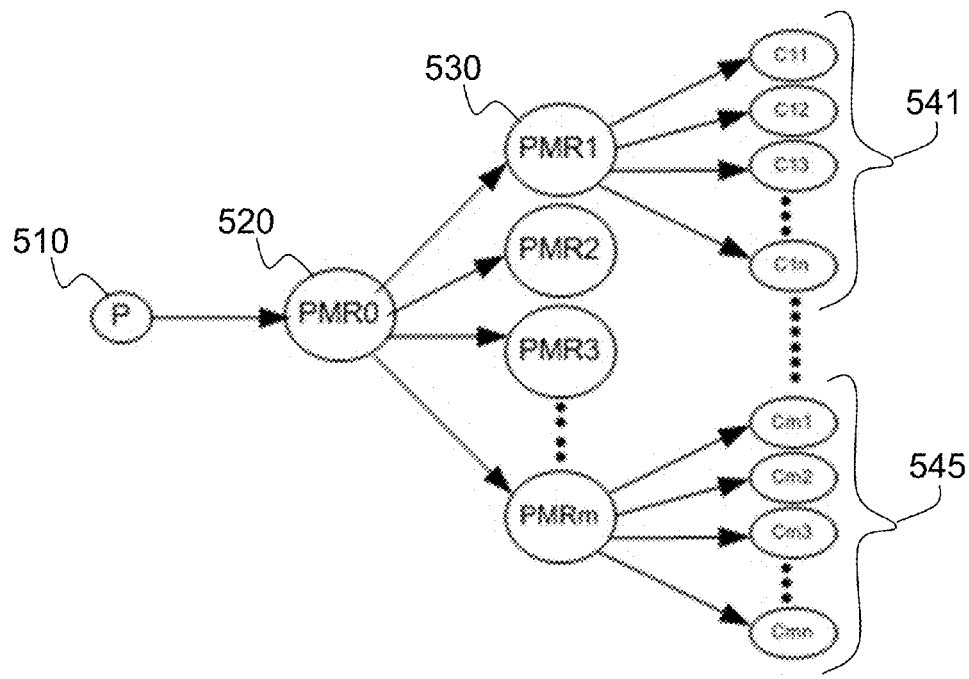
FIG. 5 is a schematic diagram showing a PMR tree with a depth of one.

The Tree Builder builds and manages ready-to-use PMR trees in different depths and sizes. The Tree Builder takes PMRs from the PMR Pool and builds the trees. FIGS. 4 and 5 show exemplar trees. FIG. 4 shows the most basic PMR tree. The data producer 410 (e.g. Sender 110) and invokes PMR 420 (e.g. 130) to reach up to the maximum number of data consumers 430 (e.g. Viewer 150). FIG. 5 shows a PMR tree with a depth of one. The data producer 510 invokes its PMR 520 (e.g. 130), and the Pool Manager 126 uses up to the maximum number of connections of the PMR 520 to connect to other PMRs 530 in the pool, each of which in turn reaches up to the maximum number of data consumers (541, 545).

The Tree Builder also checks what trees are still in sending state and which ones were ruined because one of the PMRs went down.

Trees may be built upon various criteria such as:
Geographical location
ISP name
Bandwidth
etc.

The Shadow PMR

If the root PMR goes down in the middle of a session, the entire tree will collapse and all consumers will lose that segment. Worse than that, the sender will have to send all data once again—which would be problematic since the data is normally sent live.

In order to prevent that, the Root PMR (e.g. 420, 520) will have another pre-allocated PMR that will be used just to record the data that arrives to the root PMR from the sender.

Please note that the shadow PMR will get the data from the root PMR and not from the sender.

If, at any time, the Root PMR (or any other PMR in the tree) goes down, the system will take the following actions:

If the root PMR went down, make the necessary plumbing to make the shadow PMR the root PMR. Plumbing in this case will be:

Sender will start sending data to the shadow PMR directly. Upon switching the sender will verify that no packets were lost and continue from there.

All connections of the data consumers of the root PMR will be replaced with connections to the shadow PMR.

If another PMR in the PMR tree will go down, a new PMR from the PMR pool will be allocated and necessary plumbing will be done to recover the sub-tree.

The data will be copied from the shadow PMR directly to the new PMR.

PMR Pool Implementation

The PMR Pool is built and managed by the PMR Pool Manager 126 (PPM).

Each PMR sends constant XMPP status and info (such as IP and ports info) messages to the PPM which resides on the Mediator Node 120. The PPM 126 keeps the info in a "database" 129 that resides in the RAM memory and maintains it according to the incoming messages from the PMRs and from the Tree Builder and Tree Manager.

There are many possible implementations of the "database" 129, e.g. hash table.

Tree Implementation

Each tree will be implemented as a table in the Mediator Node 120 RAM memory. There are well-known implementations of a tree in a table. In such an implementation, each node contains some data and pointer to its children and possibly to the father node and there is a pointer to the root node so the tree can be accessed from the outside.

The Tree Pool can be implemented similarly as the PPM.

Tree Manager

Upon request from a data producer (sender), the Tree Manager decides what tree from the Tree Pool should be used and tells the sender by XMPP message what port on the root PMR in the allocated PMR tree to use.

It also tells the data consumers (viewers) by XMPP messages as they come along what PMRs and ports to use in order to consume the data.

If the number of consumers exceeds the maximum number of consumers that the specific tree can support, then the Tree Manager switches to a bigger tree for the next data segment and send the appropriate XMPP messages to the sender and viewers to switch as well.

While the invention has been described in terms of a single preferred embodiment, those skilled in the art will recognize that the invention can be practiced with modification within the spirit and scope of the appended claims.

The invention claimed is:

1. A personal media relay system for rebroadcasting streaming data, comprising:
   a sending device of a user for capturing media data for streaming;
   personal media relay software, downloaded by the user to a personal computer of the user, said software further comprising:
   a media receiver for receiving the captured streaming data from the sending device and for using a server mediator node to passively create and maintain a session with a peer of the sending device;
   a media resender for using the server mediator node to actively create and maintain a session with said peer of the sending device and for resending the captured streaming data,
   wherein the personal media relay system enables pooling of a plurality of personal media relay installations for construction and maintenance by the server of a tree structure for streaming of the captured media data to a plurality of peers.

2. A personal media relay system as in claim 1, wherein said media server mediator node provides a personal media relay pool manager for enabling the personal media relay software on the user's personal computer to resend the captured streaming data to a plurality of viewers.

3. A personal media relay system as in claim 2, wherein the pool manager uses personal media relay software installed on the personal computers of at least one other user to resend the captured streaming data.

4. A personal media relay system as in claim 3, wherein the pool manager constructs and maintains a tree linking the user's personal media relay software to said plurality of viewers via said at least one other personal media relay software, one personal media relay installation in the pool being allocated to serve as a root of the tree and a second personal media relay installation in the pool being allocated to serve as a shadow of the root, said shadow receiving from the root the data captured by the sending device, wherein if the root goes down the shadow is used to replace the root and the sending device verifies that no packets in the captured data were lost.

5. A personal media relay system as in claim 1, wherein said streaming data is resent using a relaxed real-time transport protocol characterized in that:
   the streaming data contains a built in delay between the sending device and the receiver;
   the steaming data is received by the media receiver in chunks, where network bandwidth allows the sending of each chunk in less time than it takes to record a next chunk;
   each chunk of data is not considered to be delivered unless it reaches the viewer as a continuous chunk;
   the order of chunks is maintained; and
   if a network failure occurs or a chunk arrives out of order then a chunk may be discarded.

6. A personal media relay system as in claim 4, wherein the user's personal media relay software is a root of said tree, further comprising a shadow personal media relay for recording data arriving at the root personal media relay software.

7. A method for rebroadcasting streaming data, comprising:
   capturing streaming data on a sending device of a user;
   downloading by a user of personal media relay software to a personal computer of the user, said software having modules, the modules comprising:
   a media receiver for receiving the captured streaming data from the sending device and for using a server mediator node to passively create and maintain a session with a peer of the sending device;
   a media resender for using the server mediator node to actively create and maintain a session with said peer of the sending device and for resending the captured streaming data, and
   pooling of a plurality of personal media relay installations for construction and maintenance by the server of a tree structure for streaming of the captured media data to a plurality of peers.

8. A method for rebroadcasting streaming data as in claim 7, wherein said media server mediator node provides a personal media relay pool manager for enabling the personal media relay software on the user's personal computer to resend the captured streaming data to a plurality of viewers.

9. A method for rebroadcasting streaming data as in claim 8, wherein the pool manager uses personal media relay software installed on the personal computers of at least one other user to resend the captured streaming data.

10. A method for rebroadcasting streaming data as in claim 9, wherein the pool manager constructs and maintains a tree linking the user's personal media relay software to said plurality of viewers via said at least one other personal media relay software, one personal media relay installation in the pool being allocated to serve as a root of the tree and a second personal media relay installation in the pool being allocated to serve as a shadow of the root, said shadow receiving from the root the data captured by the sending device, wherein if the root goes down the shadow is used to replace the root and the sending device verifies that no packets in the captured data were lost.

11. A method for rebroadcasting streaming data as in claim 10, wherein the user's personal media relay software is a root of said tree, further comprising providing a shadow personal media relay for recording data arriving at the root personal media relay software.

12. A method for rebroadcasting streaming data as in claim 7, wherein said streaming data is resent using a relaxed real-time transport protocol characterized in that:
   the streaming data contains a built in delay between the sending device and the receiver;
   the steaming data is received by the media receiver in chunks, where network bandwidth allows the sending of each chunk in less time than it takes to record a next chunk;
   each chunk of data is not considered to be delivered unless it reaches the viewer as a continuous chunk;
   the order of chunks is maintained; and
   if a network failure occurs or a chunk arrives out of order then a chunk may be discarded.

* * * * *